L. WOODWORTH.
GAS OR OIL ENGINE.
APPLICATION FILED NOV. 10, 1909.

991,405.

Patented May 2, 1911.

2 SHEETS—SHEET 1.

Witnesses:
A. L. Woodworth.
T. E. H. Frost

Inventor:
Lyman Woodworth

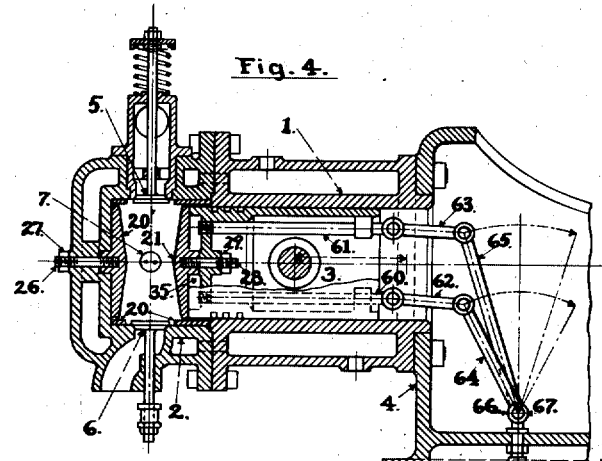
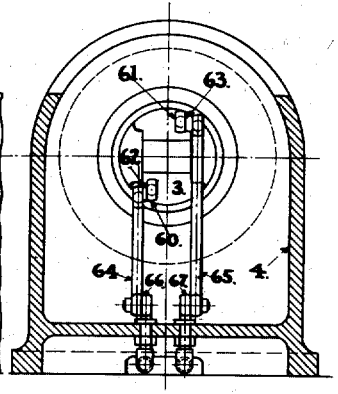
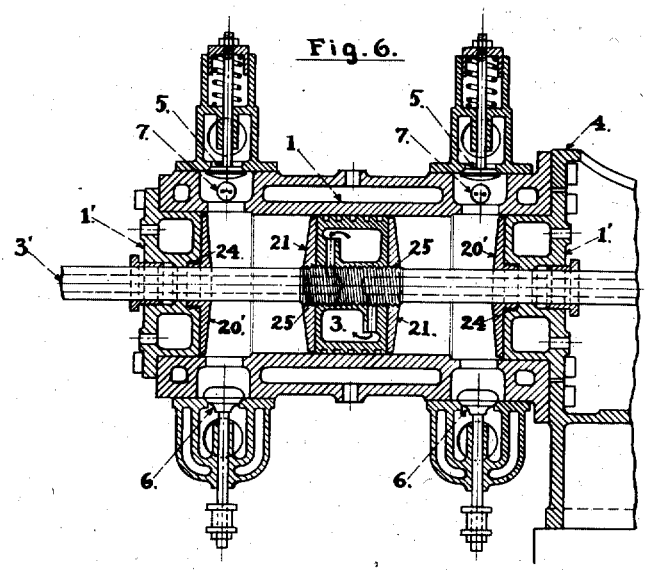

UNITED STATES PATENT OFFICE.

LYMAN WOODWORTH, OF SAN FRANCISCO, CALIFORNIA.

GAS OR OIL ENGINE.

991,405. Specification of Letters Patent. Patented May 2, 1911.

Application filed November 10, 1909. Serial No. 527,197.

*To all whom it may concern:*

Be it known that I, LYMAN WOODWORTH, a citizen of the United States, residing at San Francisco, in the county of San Francisco and State of California, have invented or discovered certain new and useful Improvements in Gas or Oil Engines, of which the following is a specification.

My invention relates to internal-combustion heat motor engines, more commonly called gas, petroleum, or alcohol engines, in which any suitable fuel, such as hydrocarbon or carbonaceous material hydrated or not, in gaseous, liquid, or finely divided state, is ignited by any suitable means such as compression, electricity, or a hot body, and burned with air, preferably compressed, the heated air and products of combustion constituting or serving as the working-fluid of the engine.

The object of my invention is to increase the efficiency and improve the fuel economy of internal-combustion engines.

My invention consists in certain improvements in the combustion-chambers, cylinders, cylinder-heads, and pistons of internal-combustion engines and in certain combinations of parts with suitable speculum metallic surfaces upon the interior thereof, confining the hot working fluid of the engine, as will be more fully hereinafter described in connection with the accompanying drawings.

Figure 1:
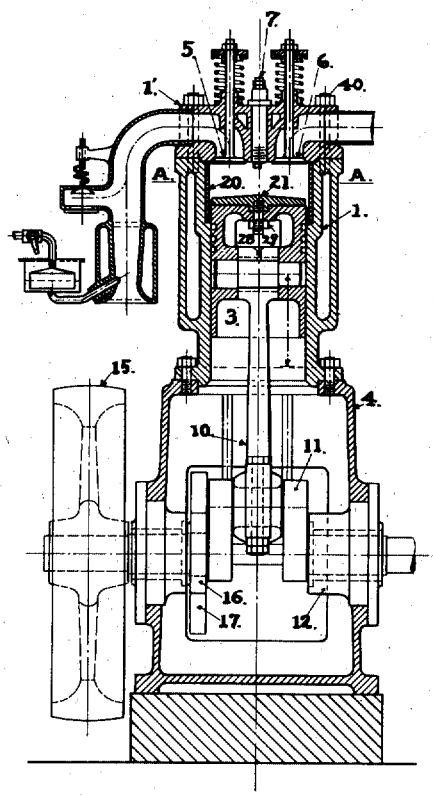
Figure 2:
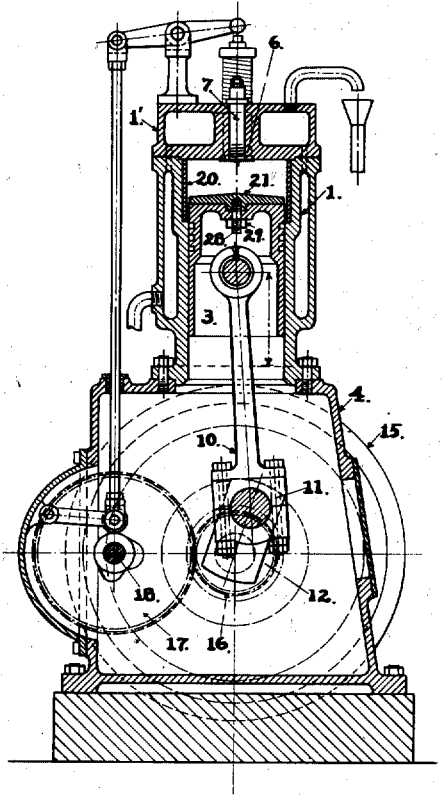
Figure 3:
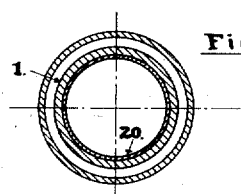

Figure 1, shows a side elevation, partly in section, of a gas or oil engine containing or embodying my improvements. Fig. 2, shows an end elevation, partly in section, of the engine shown in Fig. 1. Fig. 3 shows a cross-section A—A of the engine cylinder of Fig. 1. Fig. 4, shows a longitudinal section of the combustion-chamber, cylinder, and piston of a gas engine containing my improvements, together with means for water cooling the heat exposed parts. Fig. 5 shows an end elevation, partly in section, of the part shown in Fig. 4. Fig. 6 shows a longitudinal section of the cylinder, cylinder-heads, and piston of a double-acting gas engine with my improvements.

Referring to Figs. 1, 2, and 3, the water-jacketed cylinder 1 provided with the cylinder-head 1', admission valve 5, exhaust valve 6, and igniter 7, is mounted upon the engine frame 4. The engine piston 3 bearing or running in the cylinder 1, is connected by rod 10 to the crank-shaft 11 mounted in suitable bearings 12, in the frame 4. Upon the crank-shaft 11 is mounted the fly-wheel 15. The cam-shaft 18 is operated by the gear-wheels 16 and 17 so as to make one revolution to every two revolutions of the crank-shaft 11, and provided with suitable cams and connections for operating the admission valve 5, the igniter 7, and the exhaust valve 6, as is well understood in engines of the class described. The compression or combustion space end of the cylinder 1 is fitted or combined with the speculum metallic lining 20 made in length equal to the piston stroke more or less, and in inside diameter sufficiently greater than the outside diameter of the piston 3, to be out of frictional contact therewith. The piston 3 is combined with interior speculum metallic plate 21, preferably secured by center bolt 28 and nut 29.

In some forms of my invention, the engine piston 3 is made so that it does not extend into the lined portion of the cylinder; but I prefer to make the piston 3 reach into the lined compression-space a length equal more or less, to one-third of the piston stroke.

By means of the construction and combination of parts above described, the hot working-fluid of the engine or motor is confined more or less completely by the interior speculum metallic surfaces 20 and 21 respectively.

Sufficient of an internal-combustion engine is shown in Figs. 4 and 5 to illustrate the connection of my invention therewith. In this construction, the water-jacketed combustion-chamber 2 containing admission valve 5, exhaust valve 6, and igniter 7, and suitably attached to the cylinder 1, is combined with the speculum metallic lining 20, made in length equal to the piston stroke more or less, and in bore sufficient to clear the piston 3. The interior speculum metallic surfaces 20' are fixed to the head end of the combustion-chamber 2, preferably by bolt 26 and nut 27. The piston face 3, is recessed and combined with the speculum metallic plate 21 so as to form chamber or passage 35 for circulation of cooling fluid or water, and provided with suitable piping and connections, as the articulated piping 60, 62, 64 and 66 for leading water thereto, and connections 61, 63, 65, and 67 for conducting water therefrom, as is readily seen. The terminal supply and exhaust connections 66 and 67 respectively, are preferably mounted upon the engine frame 4. Obviously, telescoping piping might be used instead of the articulated piping for the purposes above described. Further, the chamber or passage 35 might be formed by recessing the plate 21 instead of the piston 3.

In Fig. 6, is shown by way of example, one form of construction of the cylinder 1, cylinder-heads 1', and piston 3 of a double-acting gas engine with my improvements, and disconnected for the sake of simplicity, from other parts of the machine. The water-jacketed cylinder 1 with operative inlet valves 5, igniters 7, and outlet valves 6, has its ends fitted with the water-jacketed heads 1' combined with the interior speculum metallic plates 20' suitably attached thereto, as by interlocking screw threaded portions 24. The water cooled piston 3 mounted on the hollow piston-rod 3', is combined on its working faces with the speculum metallic plates or sheets 21 secured in place by suitable means, such as engaging screw threads 25. The several heat exposed parts have appropriate connections for supply of cooling fluid or water, not shown, as is well known and requires no detailed description. The said interior surfaces 20', 21, and 21, 20' respectively serve to confine the hot working-fluid of the engine.

It is obvious that my improvements apply to combustion-chambers and pistons in gas engines of other forms and figures than those shown, and that the valve ports, igniters and the like, might be otherwise arranged; but the simple forms shown I deem best.

By speculum metallic surfaces, I mean metallic non-corrodible mirror-like surfaces; that is, I use a metal or alloy which offers a high resistance to corrosion by the hot working-fluid of the engine, and at the same time having mirror-like or reflective surfaces where exposed to said hot gases. And, I have found alloys high in nickel containing aluminum, iron, or copper or materials of equivalent chemical nature, with or without the presence of carbon or silicon, to be suitable more or less in my invention. I prefer to employ in my invention an alloy of nickel with aluminum containing ten per cent. of aluminum, more or less; but I do not limit myself to this composition.

By means of the constructions and combinations in internal-combustion engines of speculum metallic surfaces as herein described, new functions are performed and the object of my invention attained. The function of the said interior speculum metallic surfaces is to favor adiabatic-expansion of the hot working gas in the motor.

Having described my invention, I claim:

1. The combination, in an internal-combustion engine, of a cylinder, piston, and chamber at the end of the cylinder, the said chamber having non-corrodible speculum metallic interior surface confining the hot working fluid of the engine, and suitable means for cooling the said interior surfaces by circulation of cooling-fluid, substantially as described.

2. In an internal-combustion engine, the combination with the combustion-chamber of suitable speculum metallic sheets, plates, or linings in contact with the interior walls thereof, substantially as shown and described.

3. In an internal-combustion engine, the combination with the combustion-chamber of suitable speculum metallic sheets, plates or linings upon the interior surfaces thereof, and with suitable means for cooling said interior parts by circulation of cooling fluid, substantially as shown and described.

4. In an internal-combustion engine, the combination with the cylinder of suitable speculum metallic sheets, plates, or linings upon the interior surfaces thereof not in frictional contact with the piston, and with suitable means for cooling said interior parts by circulation of cooling-fluid, substantially as shown and described.

5. In an internal-combustion engine, the combination with the cylinder-head of suitable speculum metallic sheets, plates or linings upon the interior surfaces thereof, and with suitable means for cooling said interior parts by circulation of cooling fluid, substantially as shown and described.

6. In an internal-combustion engine, the combination with the piston of suitable speculum metallic surfaces upon the face or faces thereof confining the hot working-fluid of the engine, substantially as shown and described.

7. In an internal-combustion engine, the combination with the piston of suitable speculum metallic surfaces upon the face or faces thereof confining the hot working-fluid of the engine, and with suitable means for cooling said surfaces by circulation of cooling-fluid, substantially as shown and described.

In testimony whereof, I have signed this specification in presence of two subscribing witnesses.

LYMAN WOODWORTH.

Witnesses:
A. L. WOODWORTH,
E. W. HORSMAN.